Patented Aug. 8, 1933

1,921,330

UNITED STATES PATENT OFFICE 1,921,330

ACYLAMINO BENZENE STIBONIC ACIDS

Karl Streitwolf, Frankfort-on-the-Main, Alfred Fehrle, Bad Soden-on-Taunus, and Walter Herrmann and Paul Fritzsche, Frankfort-on-the-Main, Germany, assignors to Winthrop Chemical Company, Inc., New York, N. Y., a Corporation of New York No Drawing. Application May 22, 1930, Serial No. 454,828, and in Germany June 15, 1929

7 Claims. (Cl. 260—11)

The present invention relates to acylamino-benzene-stibonic acids containing a substituent in ortho-position to the stibonic acid group.

We have found that the introduction into aromatic stibonic acids of a substituent in the ortho-position to the stibonic acid group often involves a more or less marked peroral action in trypanosoma and other tropical diseases. The preparation is effected in known manner, for instance by diazotizing the corresponding amino compounds and transforming the diazo compound thus obtained with antimonite or by acylating an aminobenzene-stibonic acid. The new compounds correspond to the following general formula:

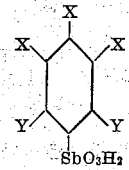

wherein one Y stands for hydrogen, the other Y for alkyl, halogen, hydroxy or oxalkyl, and one of the X's for an acylamino-group, at least one of the other X's for hydrogen, the remaining X for oxalkyl, halogen or alkyl.

These products are nearly white powders which are very easily soluble in alkalies. They have, as above mentioned, valuable properties in therapeutics.

The action caused by the introduction of the substituent in ortho-position is surprising, because the hitherto used stibonic acids such as para-acetylaminobenzene-stibonic acid, para-aminobenzene-stibonic acid, 3-chloro-4-acetyl-aminobenzene-stibonic acid, are not able to produce any action in peroral application.

The formulae in the following examples and claims only correctly express the position of the stibonic acid group in the phenyl nucleus, whereas the manner in which the antimony is bound is not definitely known. The chemical formulae of the stibonic acid are generally written for simplicity's sake in a manner analogous to that of the arsonic acid. The stibonic acids are, however, really always polymeric and contain, according to the manner in which they have been dried, more or less water, about the binding of which within the molecule nothing certain is known.

The following examples serve to illustrate the invention, but they are not intended to limit it thereto.

(1). 40 grams of 4-acetylamino-2-methyl-1-aminobenzene-hydrochloride are dissolved in 200 cc. of water and diazotized after addition of 32 cc. of concentrated hydrochloric acid. The clear diazo solution is slowly introduced at 15° C.–25° C. while stirring into a mixture of 30 grams of antimony trioxide, 60 cc. of caustic soda solution of 40° Bé., 80 grams of glycerine, 200 cc. of water and 2 grams of copper; the reactions occurs with lively evolution of nitrogen. When the reaction is complete, the mixture is neutralized with hydrochloric acid until its reaction is only feebly alkaline to phenolphthalein and then saturated with carbonic acid and filtered to produce a clear solution. The solution is acidified with hydrochloric acid, the separating stibonic acid is filtered by suction and washed with water. In order to purify it, it is dissolved in methyl alcohol, the undissolved part is removed by filtering by suction and the filtrate is precipitated with ether. The 4-acetylamino-2-methylbenzene-1-stibonic acid of the following formula

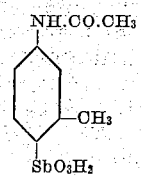

is thus obtained in the form of a white powder readily soluble in dilute alkalies, which carbonizes without melting when heated.

When starting from the corresponding valeryl- or benzoyl-compound, there is obtained as final product the 4-valerylamino-2-methylbenzene-1-stibonic acid or the 4-benzoylamino-2-methylbenzene-1-stibonic acid.

(2). 28 grams of 4-amino-2-methylbenzene-1-stibonic acid, prepared by causing diazotized 4-nitro-2-methyl-1-aminobenzene to react with alkali antimonite and reducing the nitro acid obtained, are dissolved in 150 cc. of water in the form of the sodium salt. At room teprerature 15 grams of acetic anhydride are run into this solution while stirring, and the whole is stirred, until the temperature has fallen again. Then hydrochloric acid is added until the solution has an acid reaction to Congo paper; the precipitated 4-acetylamino-2-methylbenzene-1-stibonic acid is filtered by suction and purified as indicated in Example 1.

(3). 44 grams of 4-acetylamino-2.5-dichloro-1-aminobenzene are ground in the ball mill with the quantity of nitrite solution necessary for the diazotization and water to form a thin pulp and the whole is diazotized by pouring it into 48 cc. of hydrochloric acid and 300 cc. of ice water. The diazo solution is caused to react with alkali antimonite as indicated in Example 1.

In order to purify the crude 4-acetylamino-2.5-dichlorobenzene-1-stibonic acid it is suspended in methyl alcohol, dissolved by adding a small quantity of ammonia solution and precipitated with ether in the form of an ammonium salt. A white powder is obtained which is easily soluble in water to a neutral solution. The product probably corresponds to the following formula:

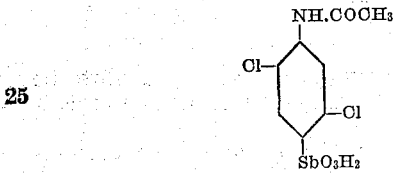

(4). 18 grams of 3-acetylamino-6-methoxy-1-aminobenzene are diazotized in the usual manner and caused to react with an alkali antimonite solution from 15 grams of antimony trioxide. The 3-acetylamino-6-methoxybenzene-1-stibonic acid is separated and purified in a manner similar to that described in the preceding examples. For the separation, the solution saturated with carbonic acid can alternatively be treated with sodium hydrosulfite, the stibinobenzene formed filtered by suction and again oxidized with hydrogen superoxide to the stibonic acid. The acid corresponds to the following formula

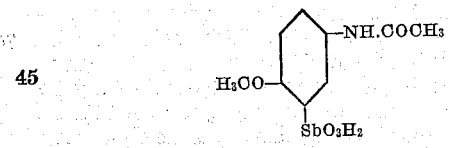

and is a nearly white powder which is very readily soluble in alkalies and ammonia.

(5). 22 grams of 3-glycolylamino-6-hydroxy-1-aminobenzene-hydrochloride, prepared by melting 3-amino-6-hydroxy-1-nitrobenzene with glycolic acid with subsequent reduction of the nitro group, are diazotized and caused to react with an antimonite solution from 15 grams of antimony trioxide.

The 3-glycolyamino-6-hydroxybenzene-1-stibonic acid is a white powder which is easily soluble in alkalies and has the following constitution:

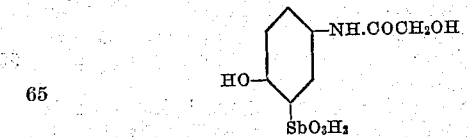

(6). 23.5 grams of 4-acetylamino-3-methoxy-6-methyl-1-aminobenzene-hydrochloride (prepared from 4-actylamino-3-methoxy-6-methyl-1-nitrobenzene by catalytic reduction of the nitro group), are diazotized, as described in the preceding examples, and caused to react with antimonite. The purification of the 4-acetyl-amino-3-methoxy-6-methylbenzene-1-stibonic acid as well as the preparation of its salts is in this case preferably effected by dissolving in methyl alcohol and precipitating with ether. The acid obtained has the following formula:

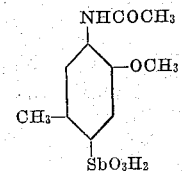

We claim:
1. The compounds of the following formula:

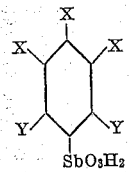

wherein one Y stands for hydrogen, the other Y for alkyl, halogen, hydroxy or oxalkyl, and one of the X's for an acylamino-group, at least one of the other X's for hydrogen, the remaining X for oxalkyl, halogen or alkyl, being nearly white powders soluble in alkali and having therapeutically valuable properties.

2. The compounds of the following formula:

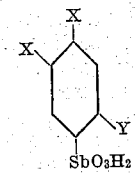

wherein Y stands for alkyl, halogen, hydroxy or oxalkyl and one of the X's for an acylamino group, the other X for hydrogen, halogen or alkoxy, being nearly white powders soluble in alkali and having therapeutically valuable properties.

3. The compounds of the following formula:

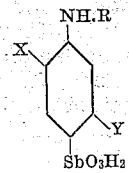

wherein X stands for hydrogen, methoxy or chlorine, Y for methyl, chlorine, hydroxy or methoxy and R for an acyl group, being nearly white powders soluble in alkali and having therapeutically valuable properties.

4. The compounds of the following formula:

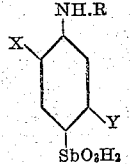

wherein X stands for hydrogen, methoxy or chlorine, Y for methyl, chlorine, hydroxy or methoxy and R for acetyl, valeryl, glycolyl or benzoyl, being nearly white powders soluble in alkali and having therapeutically valuable properties.

5. The compounds of the following formula:

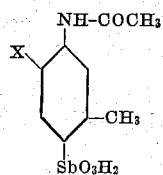

wherein X stands for hydrogen or methoxy, being nearly white powders soluble in alkali and having therapeutically valuable properties.

6. The 4-acetylamino-2-methylbenzene-1-stibonic acid, being a white powder easily soluble in alkali and having therapeutically valuable properties.

7. The 4-acetylamino-3-methoxy-6-methylbenzene-1-stibonic acid, being a nearly white powder soluble in alkali and having therapeutically valuable properties.

KARL STREITWOLF.
ALFRED FEHRLE.
WALTER HERRMANN.
PAUL FRITZSCHE.